United States Patent Office 3,782,905
Patented Jan. 1, 1974

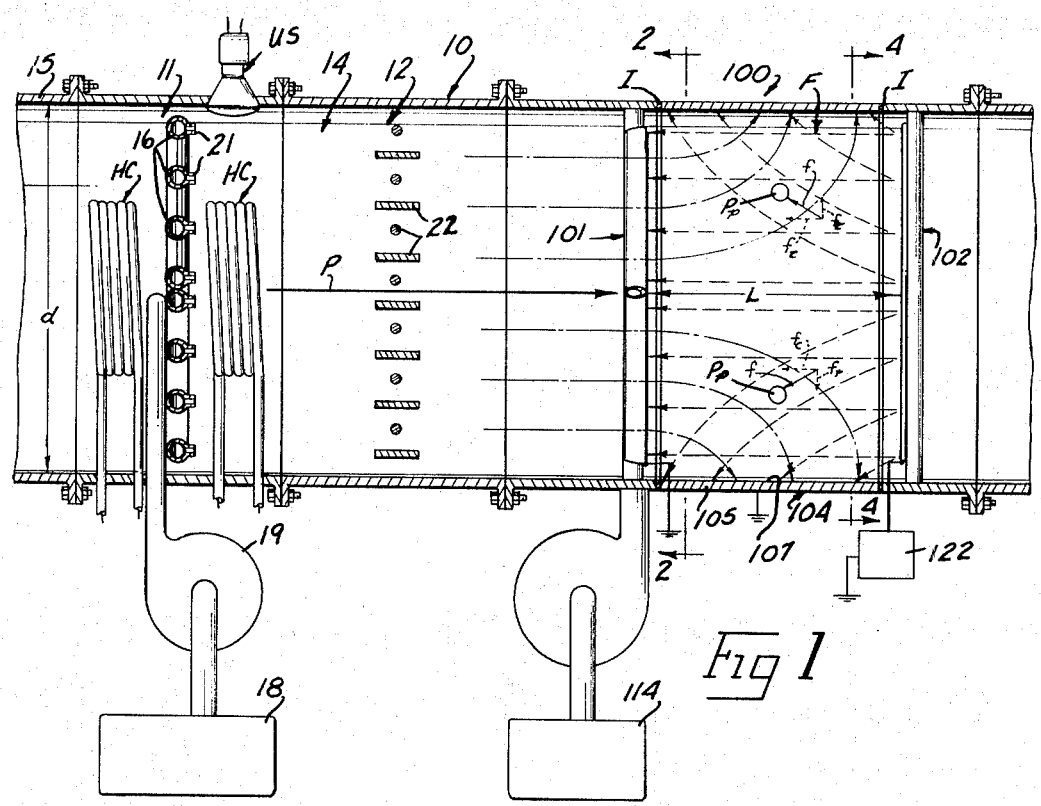
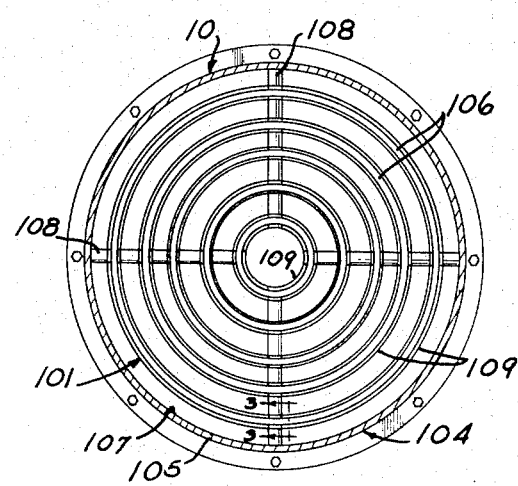
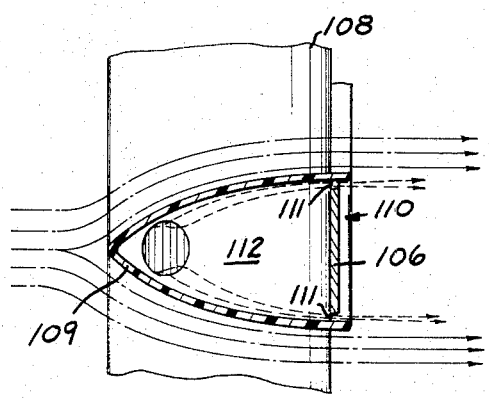

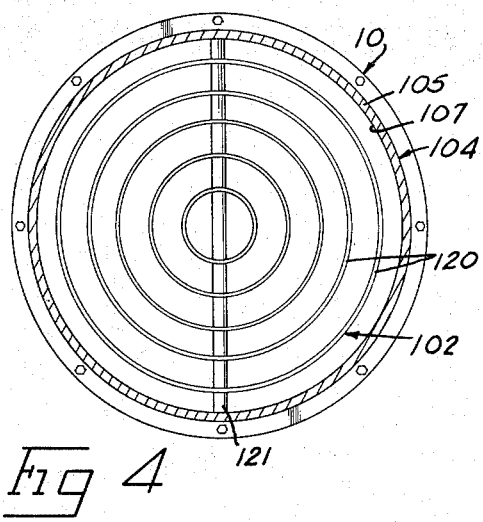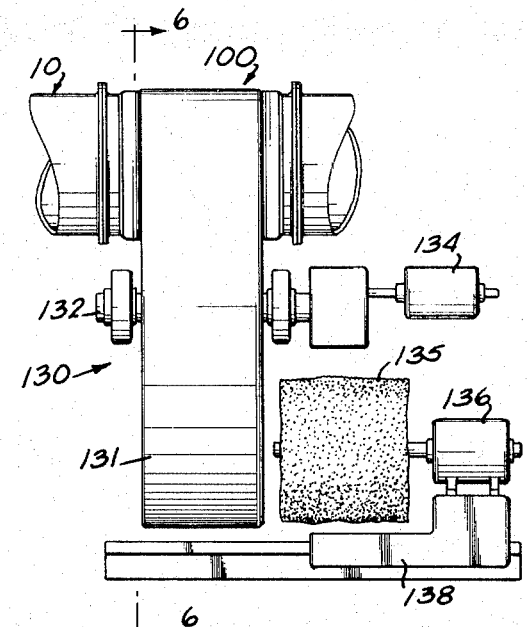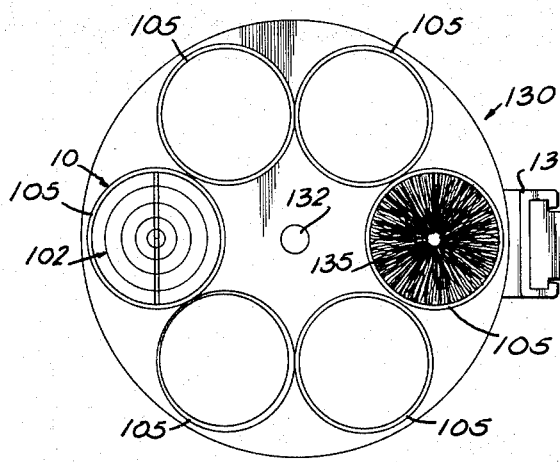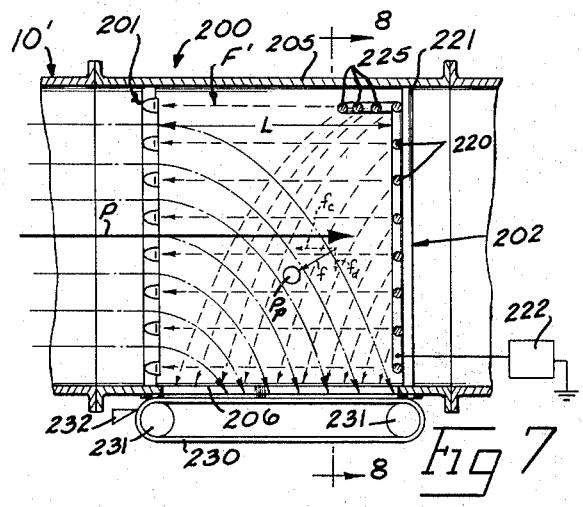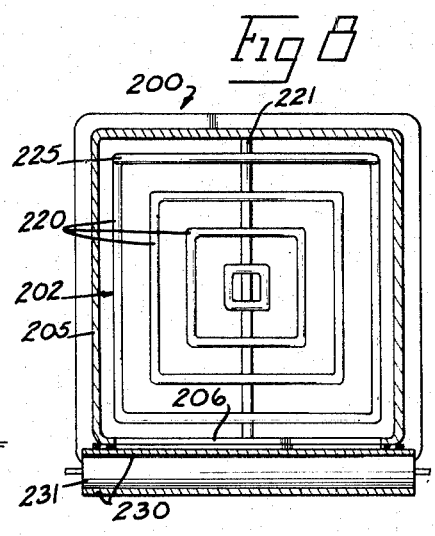

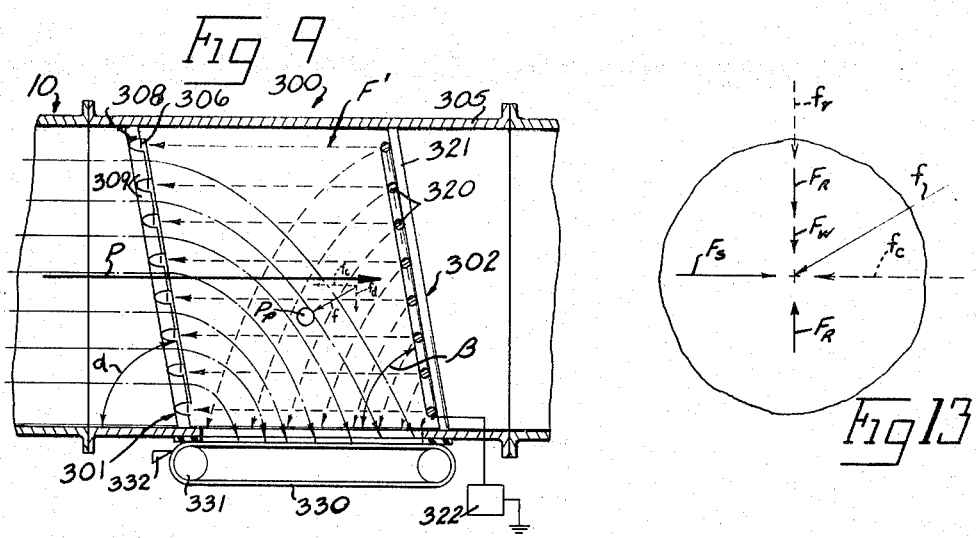
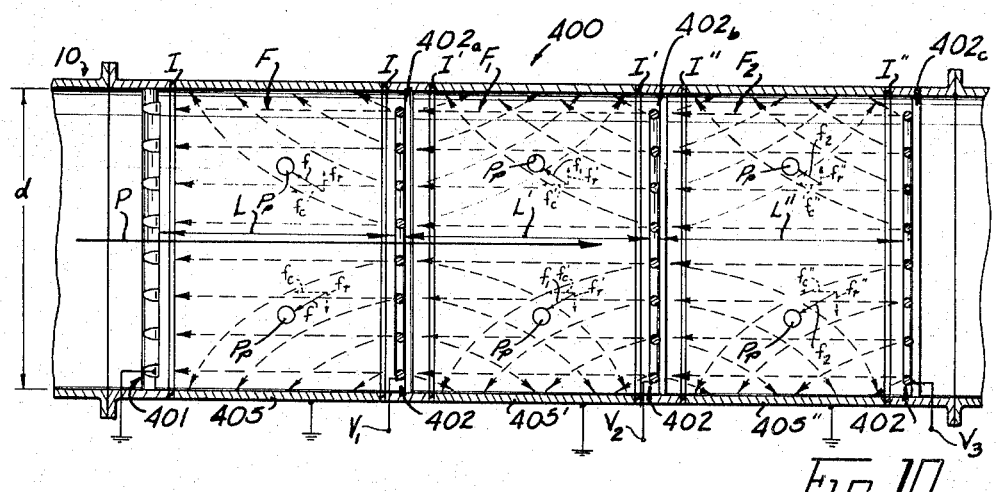
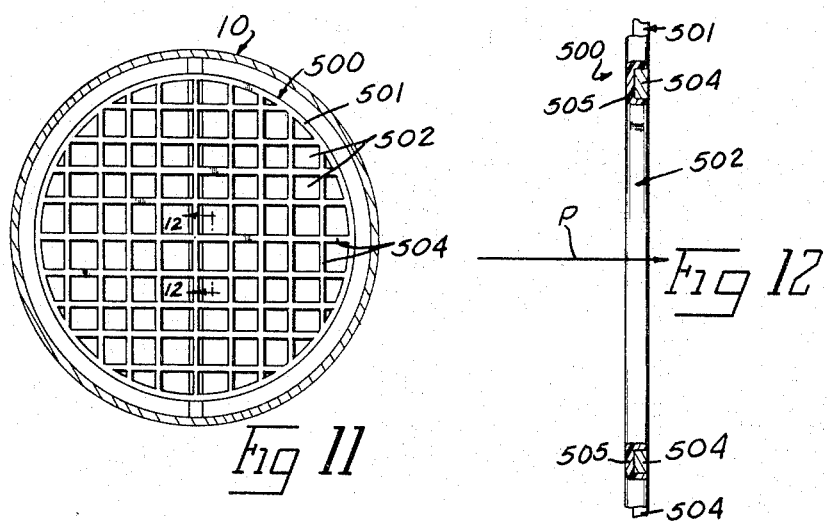

3,782,905
ELECTROSTATIC PRECIPITATING
APPARATUS AND METHOD
A. Ben Huang, 3134 Woodrow Way NE. 30319, and
Arnold L. Ducoffe, 3544 Paces Ferry Road NW.
30327, both of Atlanta, Ga.
Filed May 1, 1972, Ser. No. 249,167
Int. Cl. B03c 3/74, 3/88
U.S. Cl. 23—284                                           26 Claims

ABSTRACT OF THE DISCLOSURE

Electrostatic precipitating apparatus and method wherein the apparatus includes a tubular duct through which a gas stream is passed, a converter within the duct for converting gaseous pollutants into entrained particles, a charging means within the duct downstream of the converter for imposing an electrical charge of predetermined polarity on the entrained particles, and a separating section within the duct downstream of the charging means for separating the entrained electrically charged particles from the gas stream. One embodiment of the separating section includes an entry grid intersecting the path of gas flow with a charge thereon of opposite polarity with respect to the charge on the particles, an exit grid downstream of the entry grid with a charge thereon of the same polarity as the charge on the particles, and that portion of the duct wall between the grids having a charge thereon of opposite polarity to the charge on the particles. Another embodiment of the separating section adds additional exit grids to the above embodiment spaced downstream from the first exit grid and from each other with each of the additional exit grids having a charge thereon of the same polarity as that on the particles but with a greater potential than the next adjacent upstream exit grid, and with the duct wall between each adjacent pair of exit grids having a charge thereon of opposite polarity to the charge on the particles.

The method is that carried out by the above apparatus.

BACKGROUND OF THE INVENTION

Electrostatic precipitators are available on the market today. These prior art precipitators first charge the entrained particulate matter in a gas stream and then separate the thusly charge particles by passing the gas stream with the charged particles therein through a series of charged members or grids imposed in the stream path. All of these precipitators collect the separated particles on the oppositely charged members or grids. This causes the collecting efficiency of the grids to quickly lose their collecting ability due to the insulation formed by the collected particles and requires a greater grid potential to maintain operation. Attempts have been made to solve this problem by intermittently preventing the gas stream from flowing across the grid and rapping the grid to dislodge the particles therefrom so that gravity will cause the particles to fall from the grid to be collected. This not only prevents the desirable continuous full operation of the precipitator but also does not completely clean the grid, thus reducing the effective operational time before the grids must be again rapped.

Because of the inefficiency of such prior art precipitators, attempts have been made to mechanically slow down the movement of the particles within the precipitator by creating highly turbulent zones in the gas stream within the precipitator to form eddies which entrap the particles. In order to create sufficient turbulency to significantly increase the particle collection capability of the precipitator, a back pressure is created requiring more power to force the gas stream through the precipitator and thus increase the cost of operating same.

SUMMARY OF THE INVENTION

These and other problems and disadvantages associated with the prior art are overcome by the invention disclosed herein by providing an electrostatic precipitating apparatus and method which separates the particles from a gas stream without collecting the particles on the primary field producing grids within the stream path so that operation is continuous. Moreover, the invention creates minimum back pressure in the stream to minimize the power required to force the gas stream through the invention. Also, because the particles are not collected on the grids within the gas stream the electrical field generating power is maintained at a minimum. Moreover, the apparatus of the invention is extremely simple thereby minimizing the construction and installation cost thereof.

The apparatus of the invention includes a duct through which the gas stream is forced, charging means for charging the particulate matter in the gas stream, and separating means for separating the charged particulate matter from the gas stream. Converter means may be provided for converting gaseous pollutants into particulate pollutants for separation.

One embodiment of the separating means includes an entry grid with a charge of opposite polarity to the charge on the particulate matter and an exit grid downstream of the entry grid with a charge of like polarity to the charge on the particulate matter. At least a portion of the duct wall between the entry and exit grids is charged like the entry grid to provide a collecting surface onto which the particulate matter is deposited. This is because an electrostatic field is generated between the entry and exit grids and the portion of the duct wall with a charge thereon which exerts a resultant force on the charged particles which has a major component of force contra to the direction of gas flow and a minor component of force normal to the direction of gas flow and toward the charged portion of the duct wall.

Additional exit grids may be spaced from each other downstream of the entry grid. The first downstream exit grid is charged to a first potential of like polarity to the charged particles, the second downstream grid is charged to a second potential of like polarity to charged particles but higher than the first potential, the third grid is charged to a third potential of like polarity to the charged particles but higher than the second potential, etc. Thus, each exit grid has a higher potential than the next upstream exit grid to generate an electrostatic force field between each pair of adjacent grids that imposes a force on the charged particles contra to the direction of gas flow.

These and other features and advantages of the invention will become more apparent upon consideration of the following specification and accompanying drawings wherein like characters of reference designate corresponding parts throughout the several views and in which:

BRIEF DESCRIPTION OF THE DRAWINGS

FIG. 1 is a longitudinal cross-sectional view of one embodiment of the invention;

FIG. 2 is a cross-sectional view taken along line 2—2 in FIG. 1;

FIG. 3 is an enlarged cross-sectional view taken along line 3—3 in FIG. 2;

FIG. 4 is a cross-sectional view taken along line 4—4 in FIG. 1;

FIG. 5 is a top view of the invention of FIG. 1 showing a wall cleaning mechanism;

FIG. 6 is a cross-sectional view taken along line 6—6 in FIG. 5;

FIG. 7 is a cross-sectional view showing a second embodiment of the separating means of the invention;

FIG. 8 is a cross-sectional view taken along line 8—8 in FIG. 7;

FIG. 9 is a longitudinal cross-sectional view of a modified form of the separating means shown in FIG. 7;

FIG. 10 is a longitudinal cross-sectional view showing a third embodiment of the separating means of the invention;

FIG. 11 is a front elevational view showing an alternate form of the grid construction;

FIG. 12 is a cross-sectional view taken along line 12—12 in FIG. 11 showing modification of the grid shown in FIG. 11; and, FIG. 13 is a free body diagram illustrating the forces on one of the entrained charged particles in the gas stream as it passes through the separating means.

These figures and the following detailed description disclose specific embodiments of the invention, however, the inventive concept is not limited thereto since it may be embodied in other forms.

DETAILED DESCRIPTION OF ILLUSTRATIVE EMBODIMENTS

Referring to the figures, the apparatus of the invention includes generally a duct 10, a converter 11 for converting gaseous pollutants in a gas stream passing through the duct 10 into particulate matter, a corona discharge unit 12 downstream of the converter 11 for charging the particulate matter entrained in the gas stream, and a separating section downstream of the corona discharge unit for separating the charged particulate matter from the gas stream. The first embodiment of the separating section is designated 100, the second embodiment is designated 200, the modification of the second embodiment is designated 300, and the third embodiment is designated 400.

Referring to FIG. 1, the duct 10 is illustrated with a circular cross-section but may have other configurations such as the square cross-section illustrated in FIGS. 7–9. The gas stream is forced or drawn through duct 10 by an external pumping means (not shown) as is well known in the art.

The converter 11 is placed within the passage 14 through duct 10 adjacent the entry end 15 thereof which receives the gas stream containing pollutants therein. The pollutants in the gas stream are usually in both gaseous form and in particulate form. The converter 11 converts the gaseous pollutants into a particulate form. Particulate as used herein means both solids and liquid droplets since both may be electrostatically charged for separation. While it is understood that many pollutants may be found, normally sulfur dioxide, carbon monoxide, and nitrogen oxides are found in exhaust gases in a gaseous form while carbon particles are normally found in particulate form. The converter 11 is used to convert the pollutants in gaseous form into particulate form by injecting a converting medium into the gas stream.

The converter 11 may have several configurations but is shown in FIG. 1 as a series of concentrically arranged pipes 16 located in passage 14 of duct 10 connected to a medium source 18 through a pump 19 and manifold 20. A plurality of nozzles 21 are provided on each pipe 16 for injecting the converting medium from source 18 into the gas stream entering the duct 10. While the nozzles 21 are illustrated as facing downstream, it is to be understood that they may be made to face upstream. It is also to be understood that the converting medium may be different for each gaseous pollutant to be converted and there may be a set of pipes 16 for each converting medium to be used or the converting mediums may be injected from a single set of pipes 16. Various converting mediums may be used, however, a list of possible mediums to be used are set forth in Table I hereinafter. The list of mediums shown in Table I is in no way meant to be all inclusive. Thus, the gas stream issues from the converter with all of the pollutants to be separated entrained in the gas stream as particulate matter ready for ionization.

The gas stream then passes through the corona discharge unit 12 of conventional construction. While various configurations may be used, a conventional plate-wire arrangement 22 is illustrated. The unit 12 may charge the particulate matter in the gas stream either positively or negatively, however, it has been found that a sufficient charge will be imposed on the particulate matter when a voltage of 20,000 volts is imposed on the plate-wire arrangement 22. Thus, the gas stream exits the corona discharge unit 12 with the particulate matter entrained therein charged.

The first embodiment 100 of the separating section is shown in FIGS. 1–4, and includes an entry grid 101 and an exit grid 102 spaced a prescribed distance L apart. The entry grid 101 is oppositely charged with respect to the charge on the particulate matter, here shown as grounded, while the exit grid 102 is charged the same as the charge on the particulate matter. Oppositely charged or opposite polarity as used herein includes a charge with unlike polarity or grounded. Thus, while the entry grids and duct walls are illustrated herein as grounded, they could have a high voltage of unlike polarity imposed thereon. The section 104 of duct 10 between the grids 101 and 102 has its side wall 105 oppositely charged like entry grid 101 or grounded as seen in the figures. Thus, when the grids 101 and 102 and side wall 105 are powered, an electrostatic force field will be established between the grids 101 and 102 and side wall 105 that will exert a force on the charged particulate matter entrained in the gas stream opposite to the direction of gas flow and normal to the direction of gas flow to separate the charged particulate matter from the gas stream and deposit same on the inside surface 107 of the side wall 105.

Referring now more specifically to FIGS. 2 and 3, the entry grid 101 includes a plurality of concentric conductor rings 106 carried on the downstream side of a plurality of radially extending circumferentially spaced support ducts 108 made of an insulating material. The rings 106 are arranged in a plane perpendicular to the path P of gas flow through the duct 10. A plurality of concentrically arranged annular ducts 109 also made of an insulating material extend between and are connected to the radial ducts 108 on the upstream side of the conductor rings 106. The annular ducts are hollow and are provided with an open mouth 110 on the downstream side thereof which is wider than the rings 106 and within which the rings 106 are positioned as seen in FIG. 3 to provide an annular opening 111 on both sides of the rings 106 which communicates with the cavity 112 within the annular duct 109. Thus, the annular ducts 109 completely cover the upstream side of the conductor rings 106 as well as the edges thereof. The rings 106 may be recessed within the annular ducts 109 to insure passage of the charged particulate matter past the conductor rings 106 before they are attracted toward the rings 106 as will become more apparent.

The internal passage in the radial ducts 108 is connected to a pressurized clean air source 114 and communicates with the cavities 112 in the annular ducts 109 so that the clean air enters through the passage in the ducts 108, passes through the cavities 112 and is discharged around the conductor rings 106 through the annular openings 111. This further insures passage of the charged particulate matter downstream of grid 101 before they are attracted toward rings 106 as will become more apparent. The rings 106 are grounded so as to be oppositely charged with respect to the charge on the particulate matter.

As best seen in FIGS. 1 and 4, the exit grid 102 includes a plurality of annular wire rings 120 mounted on a diametrically extending insulated support 121 so that rings 120 are concentric and lie in a plane perpendicular to the path P of the gas flow. The rings 120 are connected to a voltage source 122 so that the rings have a potential imposed thereon of the same polarity as the charge on the particulate matter. Because the side wall 105 is grounded like the rings 106, an electrostatic force field F is set up between the grids 101 and 102 and between the grid 102 and side wall 105 which exerts a resultant force $f$ on each particle of the charged particulate matter which has a first major component $f_c$ directed oppositely to the direction of gas flow to retard the downstream movement of the particle and a second component of force $f_r$ which is directed radially outwardly with respect to the duct 10 to direct the particle toward the nearest portion of the side wall 105 as will become more apparent.

Because the charged particles are deposited on the side wall 105, means may be provided for cleaning the inside surface 107 of the side wall 105 without interrupting the gas flow through the separating section 100. One specific embodiment of such a cleaning mechanism is shown in FIGS. 5 and 6 and is designated 130. Since many embodiments may be devised, this mechanism 130 is shown for illustrative purposes only. The cleaning mechanism 130 is shown in FIGS. 5 and 6 and includes a cylinder 131 which has a plurality of side walls 105 equally spaced about the center of rotation of cylinder 131 so that any one of the side walls 105 may be pivoted into registration with the rest of duct 10. The cylinder 131 is rotatably mounted by a shaft 132 adjacent the duct 10 so as to allow the side walls 105 to be selectively moved into alignment with the rest of the duct 10. An indexing motor 134 is connected to shaft 132 so as to allow the side walls 105 to be placed in registration with the duct 10. A cleaning brush 135 driven by motor 136 is mounted on a carriage 138 diametrically opposite the duct 10 so that when the duct 10 is in registration with one of the side walls 105, the brush 135 will be in regsitration with another of the side walls 105. Brush 135 can be rotated by motor 136 and traversed along the carriage 138 so as to be inserted within the side wall 105 in registration therewith to clean same. Appropriate washing means (not shown) may be provided for insuring that the particulate pollutants on the inside surface of the side wall 105 will be removed as a result of the brushing action. It will also be noted that the side walls 105 are arranged closely adjacent to each other so that when the cylinder 131 is indexed by the motor 134, gas flow through the duct 10 will not be appreciably interrupted to provide for continuous operation in section 100.

FIGS. 7 and 8 illustrate the second embodiment 200 of the separating section. It will be understood that the second embodiment 200 will be used to replace the first embodiment 100 in the duct 10 and since the converter 11, and the corona discharge unit 12 remain the same, they are omitted from these views for sake of simplicity. It will be noted that the duct 10 illustrated in the second embodiment 200 of the separating section has a square cross-section rather than a circular cross-section as illustrated for the first embodiment of the separating section.

The separating section 200 includes an entry grid 201 and an exit grid 202 spaced a prescribed distance L apart. The entry grid 201 is the same as the entry grid 101 for the first embodiment 100 of the separating section and is oppositely charged with respect to the charge on the particulate matter or grounded as shown herein since the particulate matter has a charge of a prescribed voltage thereon. It will be noted, however, that the grid 201 has a square configuration rather than a circular configuration like the grid 101, but, the functional arrangement of the grid 201 is the same as the grid 101.

The exit grid 202 is similar to the grid 102 with a plurality of annular wire rings 220 mounted on a diametrically extending insulated support 221 so that the rings 220 are concentric with each other and lie in a plane perpendicular to the path of the gas flow. It will be noted that the rings 221 are arranged in a configuration like the cross-section of the duct 10 and are thus in the shape of a square as illustrated in FIGS. 7 and 8. In addition, a plurality of secondary conducting members 225 are provided along the upper edge of the grid 202 and are equally spaced from each other and from the rings 220. The members 225 are positioned on that side of the exit grid 202 toward the entry 201 as will become more apparent. The rings 220 and the members 225 are connected to a voltage source 222 so that the rings and members have a potential imposed thereon of the same polarity as the charge on the particulate matter.

The section 200 has a side wall 205 extending between the grids 201 and 202 with a generally square tubular cross-section. The side wall 205 has an opening 206 in the bottom portion thereof under which is positioned a grounded collector member 230 which is insulated from side wall 205. While the collector member 230 may have any of a number of different configurations, the member 230 illustrated is a flexible conductive belt mounted on rolls 231 closely adjacent the opening 206 and lying outside of the side wall 205. A cleaning member 232 is positioned at one end of the member 230 so as to clean the deposited particulate matter therefrom as the flexible member is indexed on the rolls 231. An appropriate mechanism (not shown) is provided for indexing the member 230 periodically to selectively clean the deposited particulate matter therefrom. It is to be further understood that the side wall 205 may be insulated from the rest of the duct 10 and grounded similarly to that of section 100.

Since the member 230 is grounded, it will be seen that when the voltage of the same polarity as that on the particulate matter is imposed on the rings 220 and members 225 of the exit grid 202, an electrostatic force field F' is set up between the grids 201 and 202 and between the grid 202 and the grounded collecting member 230. The force field F' exerts a resultant force $f$ on each particle of the particulate matter which has a first major component $f_c$ directed oppositely to the gas flow to retard the downstream movement of the particle and a second component of force $f_d$ directed downwardly perpendicular to the direction of gas flow to force the charged particle toward the collection member 230. Thus, it will be seen that the particulate matter in the gas stream will be collected on the collection member 230 and then the collection member 230 can be selectively indexed when the particulate matter collected thereon has built up to a prescribed amount. Because the particulate matter is collected on one side of the side wall 205, it will be seen that the collected particulate matter can be easily disposed of.

Referring now to FIG. 9, the modification designated 300 of the second embodiment of the separating section is illustrated. Since the converter 11 and discharge corona unit 12 remain the same, they are omitted, however, it is to be understood that they could be used in combination with this embodiment of the separating section 300. The section 300 includes generally an entry grid 301 and an exit grid 302 mounted within the side wall 305 of duct 10. It will be noted that the plane of the entry grid 301 is arranged at an angle $\alpha$ with respect to the path P of the gas flow in the vertical direction and perpendicular to the path P in the other direction. The exit grid 302 is arranged at an angle $\beta$ with respect to the path P of the gas flow in the vertical direction and perpendicular to the path P in the other direction. The angles $\alpha$ and $\beta$ may be varied to meet the particular requirements of each individual application.

The entry grid 301 is of the same construction as the entry grid 101 in the section 100 except that the arrangement of the insulating ducts 309 and conductor rings 306 are revised to a generally square configuration to match the square configuration of the duct 10 illustrated and modified so that the vertical spacing between the rings 106 is equal. Likewise, the exit grid 302 is similar to the exit grid 102 of the section 100 except that the rings 302 are arranged to conform to the square configuration of the side wall 305 and that the spacing between the rings 320 are equal in a vertical plane. The bottom portion of the side wall 305 is provided with an opening 306 like the opening 206 and a collection member 330 is positioned thereunder like the member 230 so that the charged particulate matter can be collected thereon.

The entry grid 301 and the collection member 330 are connected to ground and the exit grid 302 is connected to the voltage source 322 to charge the exit grid with a potential of the same polarity as the charge on the particulate matter. Thus, it will be seen that an electrostatic force field F' is established between the entry grid 301 and the exit grid 302 and the exit grid 302 and the collection member 330 so that a resultant force $f$ is imposed on the charged particles of the particulate matter within the section 300 which has a first component $f_c$ directed oppositely to the direction of gas flow and a second component $f_d$ which is directed downwardly toward the collection member 330 normal to the path P of the gas flow. Therefore, the charged particles of the particulate matter entering the section 300 will be displaced downwardly and onto the collection member 330 to separate the particulate matter from the gas stream. The collection member 330 may be indexed as specified for the separating section 200 to remove the collected particulate matter therefrom.

The third embodiment 400 of the separating section is illustrated in FIG. 10. In this embodiment, an entry grid 401 is provided and a plurality of exit grids 402 are also provided. While any number of exit grids may be used in the section 400, three are illustrated and are designated 402$_a$, 402$_b$ and 402$_c$. The grids 401 and 402 are arranged so as to lie in a plane perpendicular to the direction of the gas flow with the entry grid 401 having the same configuration as the entry grid 101 because the side wall 405 is of a circular cross-section. Likewise, each of the exit grids 402$_a$–402$_c$ have a configuration similar to the configuration of the exit grid 102 of the first embodiment 100 of the separating section. The exit grid 402$_a$ is spaced a prescribed distance L from the entry grid 401, the exit grid 402$_b$ is spaced a prescribed distance L' from the exit grid 402$_a$ and the exit grid 402$_c$ is spaced a prescribed distance L" from the exit grid 402$_b$. While various distances L, L' or L" may be used, they are illustrated as equal in FIG. 10, it being understood that these distances are dependent upon the diameter $d$ of the duct 10. The entry grid 401 is grounded as with the other embodiments of the invention, the exit grid 402$_a$ is charged to a first potential V$_1$ of the same polarity as the charge on the particulate matter, the second exit grid 402$_b$ is charged to a second potential V$_2$ which is greater than the potential V$_1$ on the grid 402$_a$. The next exit grid 402$_c$ is charged to a potential V$_3$ which is greater than the potential V$_2$ on the grid 402$_b$. Thus, there will be a first force field F set up between the entry grid 401 and the first exit grid 402$_a$ which exerts a resultant component of force $f$ on each particle of the charged particulate matter which is directed oppositely to the direction of the gas flow. Likewise, a second electrostatic force field F$_1$ will be set up between the grids 402$_a$ and 402$_b$ which also exerts a component force $f_1$ on the particles of the particulate matter which is opposite to the direction of the gas flow. Also, an electrostatic force field F$_2$ will be set up between the grids 402$_b$ and 402$_c$ that exerts a component of force $f_2$ on the particles of the particulate matter which is directed oppositely to the direction of the gas flow. Thus, as the particulate matter progresses through the section 400, the particles have a force exerted thereon which is constantly and oppositely directed to the direction of the gas flow. Because there is a natural self-repulsion force between the particles of the particulate matter as a result of all of the particles having like charges thereon, this self-repulsion force will tend to displace the particles toward the side walls within the section 400 thus separating them on the side wall 405 as the particles move through the section 400. To further enhance the separation of the particles from the gas stream, the side wall 405 may be grounded as illustrated for the other embodiments of the separating section to cause the particles to be deposited thereon. Likewise, the grids 401 and 402 may be arranged to cause the particles to be separated in a single downwardly direction as illustrated in FIGS. 7–9.

Referring to FIGS. 11 and 12, an alternate embodiment of the entry and exit grids is illustrated and designated 500. The grid 500 is a plate 501 having a configuration corresponding to the cross-sectional configuration of duct 10 having a plurality of punched openings 502 therethrough to leave narrow ribs 504 in plate 501. To allow use of the grid 500 as an entry grid a thin insulating coating 505 of known material may be used to cover the upstream facing side of plate 501 and the edges of the openings 502 as seen in FIG. 1. To make an exit grid, the coating 505 is omitted. The grid 500 is substituted for the grids described hereinbefore and serves the same function.

OPERATION

In operation, it will be seen that the polluted gas stream is forced or drawn through the duct 10 along the path P. If the polluted gas stream contains gaseous pollutants as is generally the case with exhaust gases, the stream first passes through the converter 11. The converting medium is injected into the gas stream whereupon the medium reacts with the gaseous pollutants to form particles. Because different mediums may be used for each type of gaseous pollutant or for different pollutants, it is to be understood that more than one injection unit, here shown as pipes 16 and nozzles 21, may be necessary to obtain conversion of all of the gaseous pollutants. Also because the converting medium itself may be in a gaseous, liquid or solid state, it may be necessary to modify the converter to inject the particular medium. However, it is to be understood that such modification is within the scope of the invention.

When the gas stream is exhaust gases from a power source such as factory or electrical power plants or internal combustion engines, the converting medium may be selected from those identified in Table I attached hereinafter.

For example, sulfur dioxide ($SO_2$) may be converted into solid particulate matter by injectiong ammonia ($NH_3$) from nozzles 21 or injecting calcium oxide (CaO) or manganese dioxide ($MnO_2$) in powder form through nozzles 21. Heating coils HC may be placed in duct 10 to assist in heating the gas stream for better reaction. The nitrogen dioxide ($NO_2$) may be converted into an aerosol containing both liquids and solids by injecting one of the cyclic olefin compounds such as ethylene from nozzles 21. An ultraviolet source US, here shown as a sun lamp but may be a mercury arc, may be provided for enhancing the reaction speed. The nitric oxide (NO) can first be converted to nitrogen dioxide by the injection or air or oxygen ($O_2$) and then converted as above described.

Carbon monoxide, on the other hand, can be converted into harmless carbon dioxide ($CO_2$) by the injection of air or oxygen ($O_2$) as is well known especially if the gas stream is heated by coils HC. Also, the carbon monoxide can be converted by injection lead chloride combined with water $PbCl_2 \cdot H_2O$ with the lead being removed by the separating sections. It must also be noted that converter 11 may not be necessary if only particulate matter already in the gas stream is to be removed.

After the gas stream exists the converter 11 it enters the corona discharge unit 12 as it moves along path P in duct 10. The unit 12 operates in known manner to charge the particles in the gas stream to a predetermined level with a particular polarity. The plate-wire arrangement 22 has either the plate or wire grounded in conventional manner with either a positive or negative polarity potential imposed on the ungrounded plate or wire. Thus if a positive polarity potential is imposed thereon, it will be seen that the particles passing therethrough while entrained in the gas stream will have a resulting positive charge imposed thereon while a negative polarity potential will impose a negative charge on the particles.

It is also to be understood that some of the particles within the gas stream may more readily accept a charge thereon of either a positive polarity or negative polarity. If such is the case, it may be necessary to have a first corona discharge unit 12 for imposing a charge on the particles of one polarity and the gas stream passed through the separating section 100, 200, 300 or 400 to separate those particles which have accepted a charge. The gas stream can thereafter be passed through a second corona discharge unit 12 to impose a charge on the remaining particles of the other polarity and the gas stream passed through a second separating section 100, 200, 300 or 400 to separate the remaining particles.

Referring to the free body diagram as best seen in FIG. 13 of a particular charged particle $P_p$ of the particulate pollutant matter in the gas stream as it issues from the corona discharge unit 12, it will be seen that the gas stream exerts a force $F_S$ on the particle $P_p$ due to its entrainment generally parallel to the path P of movement of the gas stream through the duct 10. This path P is horizontal as seen in the figures, however, it is to be understood that path P could be at other positions such as vertical. Also forces $F_R$ will be exerted on the particle $P_p$ by the self-repulsion between particles due to their charges of like polarity. Because the outside layer of particles $P_p$ adjacent the side wall of the duct 10 has no repulsion with respect to the side wall, there will tend to be a general drift of the particles $P_p$ toward the side wall. There will also be a gravitational force $F_W$ acting on the particle $P_p$, however, such force is generally insignificant in the operation of the invention.

When a particle $P_p$ passes within the first embodiment 100 of the separating section, it passes between the annular ducts 109 as indicated by phantom lines in FIG. 3 and is deflected past the grounded conductor rings 106 by the clean air shown in dashed lines in FIG. 3 issuing through the openings 111 on both sides of the rings 106. The particle $P_p$ is now located within the side wall 105 and is acted on by the electrostatic force field F between the grids 101 and 102 and side wall 105. It will be noted in FIGS. 1 that side wall 105 is insulated from the rest of the duct 10 at I. Thus, as seen in FIG. 13, the force field F will exert a resultant force $f$ on the particle $P_p$. The force $f$ has one component $f_c$ which is diametrically opposite to the force $F_S$ of the gas stream on the particle. The component $f_c$ serves to retard the movement of the particle $P_p$ along the path of movement P. The force $f$ also has a component $f_r$ generally perpendicular to the path of movement P. The component $f_r$ is directed radially outward from the path of movement P so that the particle $P_p$ will be deflected outwardly toward the nearest portion of side wall 105. This deflection is seen by the phantom lines in FIG. 1. Thus, the particles $P_p$ will be deflected toward and collected on the inside surface 107 of side wall 105 in an outwardly flaring funnel shaped pattern. It will also be noted that the contra component $f_c$ is the major component of force $f$ and the radial component $f_r$ is the minor component since the major part of the electrostatic force is used to slow down the particle so that it can be easily separated.

The distance L between the entry grid 101 and exit 102 may be varied for the optimum separating efficiency. The distance L will depend on the diameter $d$ of duct 10. Also, the potential difference between the entry and exit grids 101 and 102 and between the exit grid 102 and side wall 105 may be varied to obtain maximum separation. It has been found, however, that a potential difference of 10,000 to 40,000 volts between grids 101 and 102 and between grid 102 and side wall 105 is sufficient. In practice, the potential difference is maintained as high as possible without arcing. Of course it is to be understood that additional sections 100 may be placed downstream of the section 100 illustrated to remove any particles from the gas stream that were not removed in the first section 100. Also, it will be noted that the electrostatic field F acts as a means for charging the particles $P_p$. Thus, in some cases, the corona discharge unit 12 may not be necessary where the particles will be both charged with a charge of a polarity like grid 102, especially if the grid 101 is grounded, and separated from the gas stream after the charge is imposed thereon.

When the cleaning mechanism 130 is used, the cylinder 131 is positioned to align one of the side walls 105 in the duct 10 so that the particulate matter will be collected on the inside surface 107 of the aligned wall 105. When the surface 107 of the aligned side wall 105 becomes coated with particulate matter to such an extent to affect the collecting efficiency thereof, the cylinder 131 is indexed by motor 134 until the next side wall 105 is aligned with the duct 10 without interrupting the operation of the section 100. When the coated side wall 105 is indexed to the cleaning brush 135, it is rotated by motor 136 and moved along carriage 138 to clean the side wall 105. Thus, it will be seen that the operation is continuous.

In the operation of the second embodiment 200 of the separating section, the particles $P_p$ pass the grid 201 in the same manner as described for grid 101. The electrostatic force field F' will exert the force $f$ on the particle $P_p$ with the component $f_c$ diametrically opposite the force $F_S$ thereon in the same manner as the force $f_c$ of field F to retard the movement of the particle along path P. The component $f_d$ of force $f$ as seen in FIG. 7 corresponds to force $f_r$ of field F in that it is directed normal to path P, however, it is different in that it is directed only toward the collection member 230 completely across the cross-section of the side wall 205. Thus, the particles within section 200 will be deflected toward the collection member 230 across the entire cross section of side wall 205 as indicated by phantom lines in FIG. 7.

When the collection member 230 has been sufficiently coated with the collected particulate matter to lose its collecting efficiency, the member 230 is indexed to place a clean portion thereof in registration with the opening 206 in the side wall 205 to provide for continuous operation while the cleaning member 232 cleans the coated portion of member 230. While only one member 230 is illustrated, it is to be understood that additional members 230 may be positioned around the side wall 205 and in combination with additional members 225 on exit grid 202 on that side of the passage 214 of side wall 205 opposite the additional collection members 230 to also separate the particles from the gas stream. It is also to be understood that different types of cleaning mechanisms and collection members may be used in lieu of those illustrated.

The operation of the modification 300 of the second embodiment of the invention is virtually the same as the second embodiment thereof. Because the angles $\alpha$ and $\beta$ for grids 301 and 302 are selected in the range of 45° to 90°, the component $f_c$ of force $f$ retards movement of the particles $P_p$ while the component $f_d$ of force $f$ deflects all of the particles toward the collecting member 330 as indicated by phantom lines in FIG. 9. It will be noted that the plane of the charged surfaces of grids 301 and 302 define the included acute angles $\alpha$ and $\beta$ with the plane of the surface of the collection member 330 exposed to the gas stream and intersect the plane of the collection member along a line normal to the longitudinal centerline of the member 330 which is parallel to the path P along which the gas stream passes. Also, the exit grid 302 extends over the member 330 from the downstream end thereof.

As seen in FIG. 10, the particle $P_p$ passes through the entry grid 401 of the third embodiment 400 of the separating section in the same manner as it passes grid 101 in the first embodiment 100. Because the side wall 405 is grounded, the particles are subjected to the same forces $f_c$ and $f_r$ as they move between grids 401 and $402_a$ as described for the first embodiment 100 of the separating section to be collected on side wall 405 between grids 401 and 402$_a$, the side wall 405 being insulated from the rest of the duct 10 at I.

If the particle P$_p$ is not separated in the field F between grids 401 and 402$_a$, it passes downstream of grid 402$_a$. Unlike the first embodiment 100 wherein the charged particle would be speeded up when it passed downstream of the exit grid 102, however, it encounters the electrostatic field F$_1$ to exert the force $f_1$ thereon with the contra component $f_c{'}$ and the radial component $f_r{'}$ seen in FIG. 10 which causes the particle to continue to slow down while at the same time continue to be deflected outwardly toward the grounded side wall 405$'$ between grids 402$_a$ and 402$_b$. It will be noted that side wall 405$'$ is also insulated from the rest of duct 10 at the insulators I$'$. The electrostatic field F$_1$ will be generated as long as the potential on grid 402$_b$ is greater than that on grid 402$_a$ and of the same polarity as grid 402$_a$ and the charge on the particles. The side wall 405$'$ is charged with a polarity opposite to that of grid 402$_b$, here shown as grounded, to continue to attract the particle theretoward and collect same thereon.

Likewise, if the particle P$_p$ is not separated from the gas stream in the field F$_1$ between grids 402$_a$ and 402$_b$, it passes downstream of grid 402$_b$ to be subjected to the electrostatic field F$_2$ between grids 402$_b$ and 402$_c$. Because the potential imposed on grid 402$_c$ is always greater than that on grid 402$_b$ and of the same polarity as the potential on grid 402$_b$ and the particles P$_p$, the force $f_2$ exerted on the particle P$_p$ has a component $f_c{''}$ contra to the flow of the gas stream and a component $f_r{''}$ in a radial forces between the particles will cause them to drift toward the side walls as they are slowed down by the contra forces from force fields F, F$_1$ and F$_2$.

The difference between the operation of a precipitator using a series of separating sections 100 and the separating section 400 is that each time a particle moves downstream of an exit grid 102, it is accelerated until it passes the next downstream entry grid 101 whereas a retarding force is constantly exerted on the particle from the time it enters the section 400 until the time it leaves the section. This results in reducing the section 400 to a minimum by maximizing the separating efficiency thereof.

With the invention disclosed herein, the less turbulent the flow of the gas stream through the duct 10 the better the separating efficiency. Thus, the sections of the invention are designed to introduce a minimum of turbulence into the gas stream unlike those prior art precipitators which use turbulence to mechanically slow down the particles. This results in maintaining the pumping power necessary to force the gas stream through the precipitator at a minimum.

The use of grid 500 in lieu of the grids previously illustrated does not materially change the operation as above described. It will be noted that the coating 505 may be necessary when grid 500 is used in lieu of the entry grids 101, 201, 301 or 401 to prevent collection of the particles thereon.

While specific embodiments of the invention have been disclosed herein, it is to be understood that full use may be made of modifications, substitutions and equivalents without departing from the scope of the inventive concept.

TABLE I

| Gaseous pollutant to be converted | Converting medium | Medium state | Particulate product | Product State |
|---|---|---|---|---|
| Sulfur dioxide (SO$_2$) | Ammonia (NH$_3$) | Gas | Ammonium sulfate [(NH$_4$)$_2$SO$_4$] | Solid. |
| Do | Calcium oxide (CaO) | Solid | Calcium sulfate (CaSO$_4$) | Do. |
| Do | Manganese Dioxide (MnO$_2$) | do | Manganese sulfate (MnSO$_4$) | Do. |
| Nitrogen dioxide (NO$_2$) | Cyclic olefin group | Gas | Aerosol | Liquid/gas. |
| Nitric oxide (NO) | Air/oxygen (O$_2$) | Gas | Nitrogen dioxide (NO$_2$) | Gas. |
| Carbon monoxide (CO) | do | Gas | None | |
| Do | Lead chloride (PbCl$_2$·H$_2$O) | Solid | Lead | Solid. | direction with respect to the side wall 405$''$ and normal to the path P. The side wall 405$''$ is also grounded and insulated from the rest of duct 10 at I$''$. This insures that the particles will continue to be attracted toward the side wall 405$''$.

It is to be further understood that while only three grids 402 are illustrated in FIG. 10, additional grids 402 may be placed downstream of those illustrated with each having a higher potential imposed thereon than the adjacent upstream grid 402 with the same polarity as the adjacent upstream grid 402 to generate a repulsive force field. While different voltages V$_1$, V$_2$ and V$_3$ may be used depending on the particular kind of particles to be separated and the desired separating efficiency, one set of suggested voltages is 10,000 volts for voltage V$_1$, 20,000 volts for voltage V$_2$, and 30,000 volts for voltage V$_3$. As discussed with the first embodiment 100 of the separating section, the distances L, L$'$ and L$''$ between grids 401 and 402$_a$–402$_c$ may be varied for maximum separating efficiency and will depend on the diameter $d$ of the passage defined by side walls 405, 405$'$ and 405$''$.

In some applications, the grid 401 may not be necessary with all of the separation taking place between the grids 402$_a$–402$_c$. If such is the case, grid 401 can be eliminated and the side wall 405 need not be grounded.

It is also to be understood that in some instances the side walls 405, 405$'$ and 405$''$ may not need be oppositely charged or grounded. This is because the self repulsion

We claim:

1. An electrostatic precipitator for separating suspended particles charged with a potential of a predetermined polarity from a gas stream including:
   duct means through which the gas stream containing the suspended particles therein passes; and,
   electrostatic field producing means for generating an electrostatic force field within said duct means, said electrostatic field imposing a repulsive force on said particles opposite to the general line of movement of the gas stream and the suspended particles therein through said duct means and a deflecting force on said particle generally normal to said general line of movement of said particle, said field producing means comprising:
     first grid means positioned in said duct means through which the gas stream passes; and
     second grid means positioned in said duct means downstream of said first grid means and through which the gas stream passes,
     said first grid means having a charge thereon of opposite polarity to the charge on the charged particles,
     said second grid means having a charge thereon of the same polarity as the charge on the charged particles, and at least a portion of said duct means between said first and second grid means having a charge thereon of opposite polarity to the charge on the charged particles to generate said force field between said first and second grid means, and between said second grid means and said charged portion of said duct means.

2. The electrostatic precipitator of claim 1 wherein said first grid means is grounded.

3. The electrostatic precipitator of claim 1 further including charging means positioned in said duct means upstream of said electrostatic field producing means and through which the gas stream with the entrained particles therein passes for imposing an electrostatic charge on the entrained particles of a prescribed polarity.

4. The electrostatic precipitator of claim 3 further including conversion means positioned with said duct means upstream of said charging means for converting selected gaseous pollutants in the gas stream into particles capable of accepting an electrostatic charge thereon.

5. The electrostatic precipitator of claim 1 wherein said first grid means includes electrical insulating means on the upstream side thereof to prevent attraction between the upstream side of said first grid means and the charged particles.

6. The electrostatic precipitator of claim 5 further including deflection means operatively associated with said first grid means for deflecting the gas stream and particles entrained therein away from the downstream side of said first grid means as the gas stream with the particles entrained therein passes through said first grid means.

7. The precipitator of claim 6 wherein said deflection means includes a supply of clean air, a supply duct communicating with said supply of clean air and defining a discharge opening therein, and pumping means for forcing clean air from said supply of clean air through said supply duct and out said discharge opening, said discharge opening arranged to direct the clean air across the edges of said first grid means to deflect the particles away from the downstream side of said first grid means.

8. The electrostatic precipitator as set forth in claim 1 wherein said first grid means defines a first charged surface lying in a plane substantially perpendicular to the path of movement of the gas stream and wherein said second grid means defines a second charged surface lying in a plane substantially perpendicular to the path of movement of the gas stream.

9. The electrostatic precipitator of claim 8 wherein said second grid means further defines a third charged surface substantially parallel to the path of movement of the gas flow and positioned on that side of said second grid means facing said first grid means and positioned on the opposite side of said duct means from said charged portion of said duct means.

10. The electrostatic precipitator as set forth in claim 1 wherein said first grid means defines a first charged surface and wherein said second grid means defines a second charged surface, said first and second charged surfaces each lying in a plane substantially perpendicular to the path of movement of the gas stream in a first direction and defining an included angle between said plane and the path of the gas stream in a second direction normal to said first direction greater than 45° and less than 90°.

11. The electrostatic precipitator of claim 1 further including cleaning means for selectively cleaning particles collected thereon from the gas stream therefrom.

12. The electrostatic precipitator of claim 1 wherein said duct means includes a tubular side wall encircling said first and second grid means, said tubular side wall including an electrically conductive section encircling the space between said first and second grid means and insulated from the rest of said tubular side wall, said conductive section being that portion of said duct means onto which the charge of opposite polarity to the charge on the particles is imposed.

13. The precipitator of claim 12 wherein said first grid means and said conductive section are grounded.

14. An electrostatic precipitator for separating suspended particles from a gas stream including:
   duct means through which the gas stream containing the suspended particles therein passes; and,
   electrostatic field producing means for generating an electrostatic force field within said duct means, said electrostatic field imposing a repulsive force on said particles opposite to the general line of movement of the gas stream and the suspended particles therein through said duct means and a deflecting force on said particle generally normal to said general line of movement of said particle, said field producing means comprising:
      first grid means positioned in said duct means through which the gas stream passes having a charge thereon of opposite polarity with respect to the charge on the particles; and,
      a plurality of second grid means positioned in said duct means downstream of said first grid means and through which said gas stream passes having a charge thereon of the same polarity as the charge on the particles, said second grid means spaced from each other a prescribed distance and each said second grid means having a higher potential imposed thereon than the next adjacent upstream second grid means to generate the electrostatic force field between said first grid means and said first downstream second grid means, and between adjacent second grid means imposing a force on each said particle opposite to the direction of gas flow through said duct means; and,
      at least a portion of said duct means between said first grid means and said first adjacent downstream grid means and at least a portion of said duct means between each adjacent pair of said second grid means having a charge thereon of opposite polarity to the charge on the particles to further generate the electrostatic force field between said second grid means and said charged portion of said duct means.

15. The electrostatic precipitator of claim 14 wherein said first grid means includes electrical insulating means on the upstream side thereon to prevent attraction between the upstream side of said first grid means and the charged particles.

16. The electrostatic precipitator of claim 15 further including deflection means operatively associated with said first grid means for deflecting the gas stream and particles entrained therein away from the downstream side of said first grid means as the gas stream with the particles entrained therein passes through said first grid means.

17. The electrostatic precipitator as set forth in claim 14 wherein said first grid means defines a first charged surface lying in a plane substantially perpendicular to the path of movement of the gas stream and wherein said second grid means defines a second charged surface lying in a plane substantially perpendicular to the path of movement of the gas stream.

18. The electrostatic precipitator of claim 17 wherein said second grid means further defines a third charged surface substantially parallel to the path of movement of the gas flow and positioned on that side of said second grid means facing said first grid means and positioned on the opposite side of said duct means from said charged portion of said duct means.

19. The electrostatic precipitator as set forth in claim 14 wherein said first grid means defines a first charged surface and wherein said second grid means defines a second charged surface, said first and second charged surfaces each lying in a plane substantially perpendicular to the path of movement of the gas stream in a first direction and defining an included angle between said plane and the path of the gas stream in a second direction normal to said first direction greater than 45° and less than 90°.

20. The electrostatic precipitator of claim 14 further including cleaning means for selectively cleaning particles collected thereon from the gas stream therefrom.

21. An electrostatic precipitator for separating particles entrained in a gas stream therefrom including:
   duct means through which the gas stream containing the entrained particles passes; and
   a plurality of grid means positioned in said duct means through which gas stream passes having a charge thereon of a prescribed polarity, said grid means spaced from each other a prescribed distance and each said grid means having a higher potential imposed thereon than the next adjacent upstream grid means to generate an electrostatic force field between adjacent grid means imposing a force on each said particle opposite to the direction of gas flow through said duct means,
said duct means including a tubular side wall defining a passage therethrough along which the gas stream passes and within which said grid means are positioned, said side wall defining at least one opening therethrough between each pair of adjacent grid means; and, further including an electrically conductive collection member selectively closing said opening and electrically insulated from said side wall, said collection member having an electrical charge thereon of opposite polarity to the charge on said grid means.

22. An electrostatic precipitator for separating pollutants from an exhaust gas stream including:
   a duct having a tubular side wall defining a central longitudinally extending passage therethrough through which said exhaust gas stream passes;
   a converting section for converting gaseous pollutants in said exhaust gas stream into particulate matter, said converting section including an injection means positioned in said passage within said tubular side wall of said duct means, a reactive converting medium effective to convert said gaseous pollutants into particulate matter, and operating means for causing said converting medium to be injected into said exhaust gas stream by said injection means;
   a charging section for imposing a charge on the particles in said exhaust gas stream, said charging section including a corona discharge unit positioned in said passage within said tubular side wall of said duct means downstream of said injection means and through which said exhaust gas stream passes, said corona discharge unit effective to impose an electrostatic charge of a predetermined polarity on said particles as they pass therethrough;
   a separating section for separating the charged particles from said exhaust gas stream, said separating section including an entry grid positioned in said passage within said tubular side wall of said duct downstream of said corona discharge unit and an exit grid positioned in said passage within said tubular side wall of said duct a prescribed distance downstream of said entry grid, said entry grid including a plurality of first electrically conductive members electrically insulated from said side wall of said duct and lying in a plane substantially normal to the general path of movement of said exhaust gas stream therethrough and insulating means on the upstream side of said first conductive members, the downstream side of said first conductive members exposed to said exhaust gas stream and said first member electrically grounded so that said downstream side thereof is grounded, said exit grid including second electrically conductive members electrically insulated from said side wall of said duct and lying in a plane substantially normal to the general path of movement of said exhaust gas stream therethrough, said second conductive members having an electrical charge of a predetermined value imposed thereon with the same polarity as the charge on said particles, and that section of said tubular side of said duct lying between said entry and exit grids being insulated from the rest of said side wall, said insulated section of said side wall being electrically grounded.

23. The electrostatic precipitator of claim 22 wherein said separating section further includes a second exit grid positioned in said passage within said tubular side wall of said duct a prescribed distance downstream of said first exit grid and a third exit grid positioned in said passage within said tubular side wall of said duct a prescribed distance downstream of said second exit grid, said second and third exit grids each including third electrically conductive members electrically insulated from said side wall of said duct and lying in a plane substantially normal to the general path of movement of said exhaust gas stream therethrough, said third conductive members of said second exit grid having an electrical charge of a predetermined value imposed thereon and of a predetermined amount greater than said charge on said second conductive members with the same polarity as the charge on said particles, said third conductive members of said third exit grid having an electrical charge of a predetermined value imposed thereon and a predetermined amount greater than said charge on said third conductive member of said second exit grid with the same polarity as the charge on said particles, that section of said tubular side of said duct lying between said first and second exit grids being insulated from the rest of said side wall, said second insulated section of said side wall being electrically grounded, and that section of said tubular side of said duct lying between said second and third exit grids being insulated from the rest of said side wall, said third insulated section of said side wall being electrically grounded.

24. The electrostatic precipitator of claim 22 further including cleaning means for cleaning said particles deposited on said insulated section of said side wall therefrom.

25. The electrostatic precipitator of claim 23 further including cleaning means for cleaning said particles deposited on said insulated sections of said side wall therefrom.

26. An electrostatic precipitator for separating suspended particles charged with a potential of a predetermined polarity from a gas stream including:
   duct means through which the gas stream containing the suspended particles therein passes; and,
   electrostatic field producing means for generating an electrostatic force field within said duct means, said electrostatic field imposing a repulsive force on said particles opposite to the general line of movement of the gas stream and the suspended particles therein through said duct means and a deflecting force on said particle generally normal to said general line of movement of said particle, said field producing means comprising:
      first grid means positioned in said duct means through which the gas stream passes; and,
      second grid means positioned in said duct means downstream of said first grid means and through which the gas stream passes,
      said first grid means having a charge thereon of opposite polarity to the charge on the charged particles,
      said second grid means having a charge thereon of the same polarity as the charge on the charged particles; and,
   wherein said duct means comprises a tubular side wall defining a passage therethrough along which the gas stream passes and within which said grid means are positioned, said side wall defining at least one opening therethrough between said first and second grid means, an electrically conductive collection member selectively closing said opening and electrically insulated from said side wall, said collection member having an electrical charge thereon of opposite polarity to the charge on said grid means.

References Cited
UNITED STATES PATENTS

| | | | |
|---|---|---|---|
| 1,291,745 | 1/1919 | Bradley | 55—134 X |
| 2,249,801 | 7/1941 | White | 55—119 X |
| 3,616,606 | 11/1971 | Vincent | 55—138 X |
| 3,650,092 | 3/1972 | Gourdine et al. | 55—137 X |

FOREIGN PATENTS

| | | | |
|---|---|---|---|
| 92,636 | 5/1923 | Austria | 55—131 |
| 959,655 | 6/1964 | Great Britain | 55—101 |
| 971,440 | 9/1964 | Great Britain | 55—113 |

DENNIS E. TALBERT, Jr., Primary Examiner

U.S. Cl. X.R.

23—260, 277 C; 55—4, 5, 11, 13, 114, 117, 121, 129, 131, 135, 138, 146, 155, DIG. 38; 423—52, 155, 224, 242, 545, 554